UNITED STATES PATENT OFFICE.

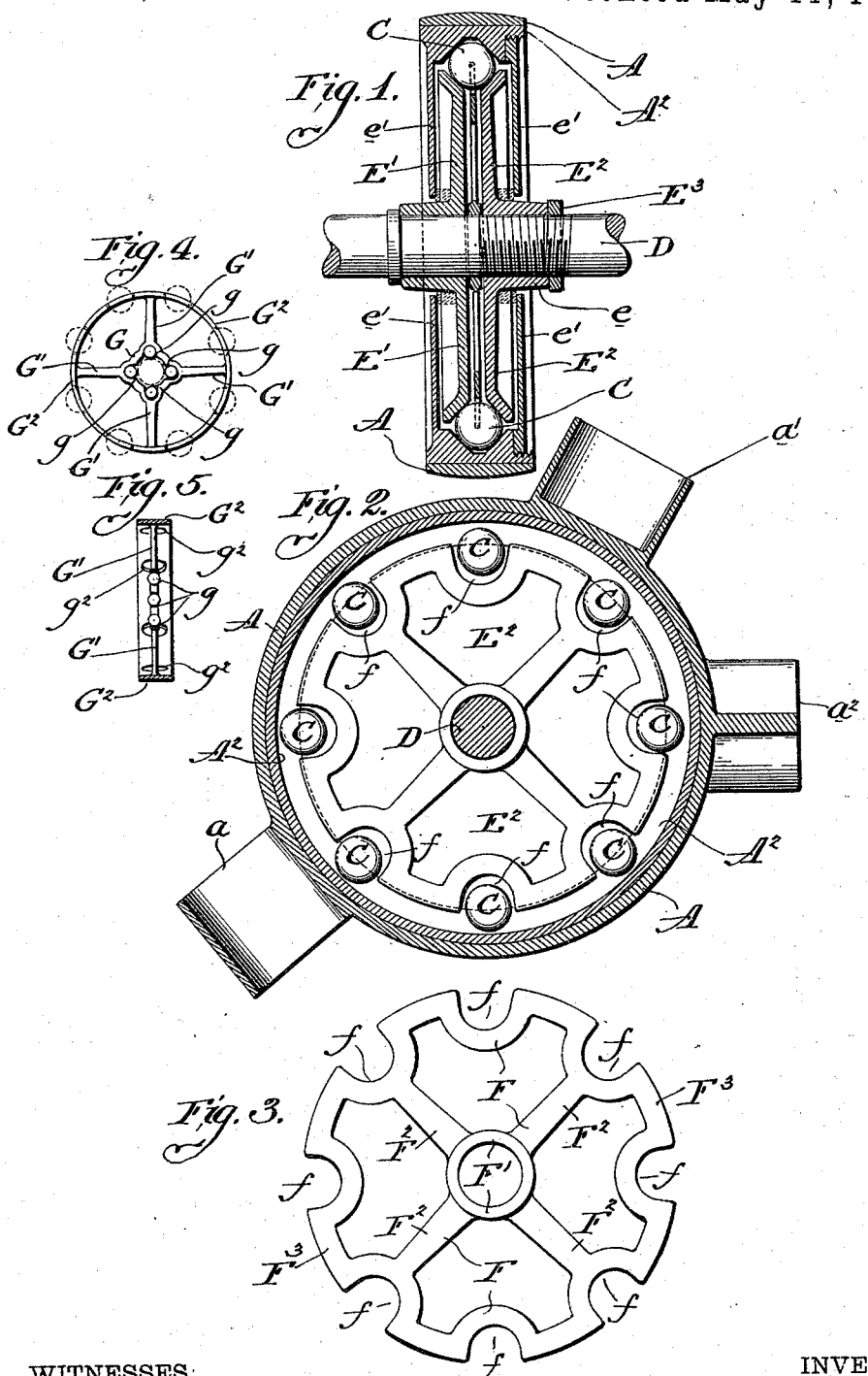

WILLIAM DIEBEL, OF PHILADELPHIA, PENNSYLVANIA.

BALL-BEARING.

SPECIFICATION forming part of Letters Patent No. 582,184, dated May 11, 1897.

Original application filed August 1, 1896, Serial No. 601,316. Divided and this application filed October 30, 1896. Serial No. 610,523. (No model.)

*To all whom it may concern:*

Be it known that I, WILLIAM DIEBEL, a citizen of the United States, residing at Philadelphia, in the county of Philadelphia and State of Pennsylvania, have invented certain new and useful Improvements in Ball-Bearings; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to ball-bearings, and more particularly to that class in which the ball circle or race is of comparatively large diameter, as in the single central bearing described and claimed in my prior applications, Serial No. 566,834, filed October 5, 1895, and Serial No. 604,500, filed September 1, 1896.

My present improvements consist in the employment of a spacing-ring for the balls, which is located between the relatively adjustable sections of a two-part disk secured to the shaft, the periphery of which disk forms the inner bearing-surface for the balls, as is fully described in connection with the accompanying drawings and specifically pointed out in the claim.

In the accompanying drawings, Figure 1 represents a vertical section of a bearing constructed in accordance with my invention. Fig. 2 illustrates a transverse section taken on the line 2 2 of Fig. 1. Fig. 3 is a detached side elevation of the spacing device. Fig. 4 is a side elevation of a slightly-modified form of spacing device, and Fig. 5 is a section on the line 5 5 of Fig. 4.

Referring to the drawings, A represents a steel ring forming part of the framework of the bicycle and having formed thereon a number of projections $a$, $a'$, and $a^2$, to which are attached the steel tubes of the frame.

Secured within or formed integral with the ring A is a grooved ring $A^2$, which forms the outer half of the ball-race of the bearing.

D represents the crank-shaft or the shaft of the vehicle-wheel for which the bearing is provided, the same being provided with a disk made up of two similar parts $E'$ and $E^2$, the former of which is rigidly secured to the shaft D and the latter being provided with an internally-threaded hub $e$, adapted to suitable screw-threads on the periphery of the shaft D, so that said part $E^2$ may be turned for the purpose of adjustment. On the threaded shaft D, I provide a locking-nut $E^3$ for the purpose of locking the disk part $E^2$ in any position to which it may be adjusted. The antifriction-balls C are placed within the space between the outer adjacent edges of the two parts of the disk and the groove of the ring $A^2$ and are guided by the notches or recesses $f$ in the spacing-ring F, which is supported upon the shaft D, between the two parts $E'$ and $E^2$ of the disk. Cover-plates $e'$ $e'$ are carried by the ring $A^2$ and serve as dust-guards for the bearing.

The spacing device for the balls consists of a flat metal ring F, with a central hub $F'$ working freely upon the shaft D, arms $F^2$ uniting the hub $F'$ and periphery $F^3$ together, and a series of notches or recesses $f$, preferably of greater width than the diameter of the balls, formed upon the periphery of the spacing device and adapted to receive and guide the balls.

In Figs. 4 and 5 I have shown a slightly-modified form of spacing device, the same consisting of a hub G, having recesses $g$ provided with balls, arms $G'$ uniting the hub with the periphery $G^2$, the latter being flattened transversely to form a rim, which has apertures $g^2$ to receive the balls.

Having now fully described my invention, what I claim, and desire to secure by Letters Patent, is—

The combination in a bearing for bicycles and the like of a shaft D, a two-part inner bearing-disk carried by said shaft with one of the parts adjustable relatively to the other part, an outer bearing-ring, balls interposed between said outer bearing-ring and the periphery of the two-part disk, and a spacing device interposed between the two parts of the disk and having its periphery recessed or notched to engage the balls, substantially as described.

In testimony whereof I affix my signature in presence of two witnesses.

WM. DIEBEL.

Witnesses:
ROBERT W. LLOYD,
HERBERT I. LLOYD.